US010613391B2

(12) United States Patent
Wang et al.

(10) Patent No.: US 10,613,391 B2
(45) Date of Patent: Apr. 7, 2020

(54) METHOD FOR PREPARING LIQUID CRYSTAL ALIGNMENT LAYER, LIQUID CRYSTAL ALIGNMENT LAYER, AND DISPLAY DEVICE

(71) Applicant: BOE TECHNOLOGY GROUP CO., LTD., Beijing (CN)

(72) Inventors: Qiangtao Wang, Beijing (CN); Yun Sik Im, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 227 days.

(21) Appl. No.: 15/533,174

(22) PCT Filed: Feb. 5, 2016

(86) PCT No.: PCT/CN2016/073628
§ 371 (c)(1),
(2) Date: Jun. 5, 2017

(87) PCT Pub. No.: WO2017/045347
PCT Pub. Date: Mar. 23, 2017

(65) Prior Publication Data
US 2017/0371210 A1 Dec. 28, 2017

(30) Foreign Application Priority Data

Sep. 18, 2015 (CN) .......................... 2015 1 0600999

(51) Int. Cl.
*G02F 1/1337* (2006.01)
*C09K 19/56* (2006.01)
(Continued)

(52) U.S. Cl.
CPC ........ *G02F 1/133788* (2013.01); *C09K 19/38* (2013.01); *C09K 19/56* (2013.01);
(Continued)

(58) Field of Classification Search
CPC ... G02F 2001/133726; G02F 1/133711; G02F 1/133788; G02F 2001/13775; C09K 19/56
(Continued)

(56) References Cited

U.S. PATENT DOCUMENTS

2011/0141417 A1 6/2011 Kim
2013/0128165 A1* 5/2013 Lee .................. G02F 1/133711
349/33
(Continued)

FOREIGN PATENT DOCUMENTS

CN 1818764 A 8/2006
CN 1831617 A 9/2006
(Continued)

OTHER PUBLICATIONS

Computer-generated translation of CN 101387781 (dated Mar. 2009). (Year: 2009).*
(Continued)

*Primary Examiner* — John A McPherson
(74) *Attorney, Agent, or Firm* — Dilworth & Barrese, LLP.; Michael J. Musella, Esq.

(57) ABSTRACT

A method for preparing a liquid crystal alignment layer, a liquid crystal alignment layer, and a display device. The method for preparing a liquid crystal alignment layer includes: S1, dripping liquid crystals and performing cell-assembling, wherein a liquid alignment material is added to the liquid crystals and the alignment material is curable and includes molecules capable of inducing alignment of liquid crystal molecules; S2, applying an electric field or a magnetic field, wherein the direction of the electric field is approximately the same as a preset direction of the liquid crystal alignment layer, and the direction of the magnetic field is perpendicular to the preset direction of the liquid crystal alignment layer; and S3, performing curing while maintaining the electric field or the magnetic field until the alignment material completes the curing reaction.

12 Claims, 1 Drawing Sheet

(51) Int. Cl.
*C09K 19/38* (2006.01)
*G02F 1/137* (2006.01)

(52) U.S. Cl.
CPC .. *G02F 1/133711* (2013.01); *G02F 1/133723* (2013.01); *G02F 2001/13775* (2013.01)

(58) Field of Classification Search
USPC ........................................................ 349/127
See application file for complete search history.

(56) References Cited

U.S. PATENT DOCUMENTS

| | | | | |
|---|---|---|---|---|
| 2013/0329151 | A1* | 12/2013 | Ma | G02F 1/133711 349/42 |
| 2015/0029453 | A1 | 1/2015 | Guo et al. | |
| 2016/0178942 | A1* | 6/2016 | Lee | G02F 1/133788 427/553 |

FOREIGN PATENT DOCUMENTS

| | | |
|---|---|---|
| CN | 101387781 A | 3/2009 |
| CN | 102087440 A | 6/2011 |
| CN | 102096244 A | 6/2011 |
| CN | 102279486 A | 12/2011 |
| CN | 102654670 A | 9/2012 |
| CN | 103792710 A | 5/2014 |
| CN | 104345499 A | 2/2015 |
| CN | 105093701 A | 11/2015 |
| JP | H04350822 A | 12/1992 |
| KR | 1020060134379 A | 12/2006 |

OTHER PUBLICATIONS

Third Chinese Office Action dated Sep. 11, 2018.
Office Action issued by the Chinese Patent Office dated Aug. 18, 2017.
International Search Report dated Jun. 15, 2016.

* cited by examiner

METHOD FOR PREPARING LIQUID CRYSTAL ALIGNMENT LAYER, LIQUID CRYSTAL ALIGNMENT LAYER, AND DISPLAY DEVICE

TECHNICAL FIELD

Embodiments of the present invention relate to a method for preparing a liquid crystal alignment layer, a liquid crystal alignment layer and a display device.

BACKGROUND

In a general liquid crystal display (LCD) device, an LCD panel is formed by a cell-assembly of an array substrate and a color filter (CF) substrate, and the inside of the two substrates must be subjected to alignment treatment for the induction of the arrangement of liquid crystal molecules. Currently, the commonly used liquid crystal alignment method is generally friction alignment method. The friction alignment method is a method for forming an alignment layer by mechanical friction. That is to say, materials such as nylon, fiber and cotton velvet are adopted to rub an alignment film of a substrate in a certain direction, and the alignment layer is formed by forming groove marks on the alignment film after friction, so that uniform anchoring function can be applied to the liquid crystal molecules, and hence the liquid crystal molecules can be uniformly and consistently arranged at a certain pretilt angle in a certain area between the two substrates. But the friction alignment method will produce a large amount of dust particles in the friction process, will damage the alignment film and devices, needs processing in the subsequent processes, and hence increases the process time and the costs. In addition, a friction uniformity of large-area substrates is hard to obtain in friction alignment, and hence a great negative impact emerges on the display effect.

SUMMARY

Embodiments of the present disclosure provide manufacturing method of a liquid crystal alignment layer, comprising:

S1: injecting liquid crystals by dropping and performing cell-assembly, wherein a liquid alignment material is added into the liquid crystals, and the alignment material is curable and comprises molecules capable of inducing an alignment of molecules of the liquid crystals;

S2: applying an electric field or a magnetic field, wherein a direction of the electric field is substantially the same as a preset direction of the liquid crystal alignment layer, and a direction of the magnetic field is perpendicular to a preset direction of the liquid crystal alignment layer; and S3: performing curing process under the electric field or the magnetic field, until a curing reaction of the alignment material is completed.

In one embodiment of the present disclosure, for example, the alignment material comprises mesomorphic molecules and a photoinitiator; and the step S3 comprises: performing photo-curing process under the electric field or the magnetic field, until a curing reaction of the mesomorphic molecules is completed under an action of the photoinitiator.

In one embodiment of the present disclosure, for example, the mesomorphic molecules constitute 1/1000-5/100 of a total amount of the liquid crystals and the alignment material.

In one embodiment of the present disclosure, for example, the photoinitiator constitutes 0.1/1000-5/100 of a total amount of the liquid crystals and the alignment material.

In one embodiment of the present disclosure, for example, ultraviolet (UV) light with a wavelength from 285 nm to 380 nm is employed in the photo-curing process.

In one embodiment of the present disclosure, for example, in the steps S2 and S3: forming the electric field between adjacent rows of data lines by applying different voltages on adjacent data lines, or forming the electric field between adjacent rows of gate lines by applying different voltages on adjacent gate lines.

In one embodiment of the present disclosure, for example, in the steps S2 and S3: forming the electric field between the adjacent rows of the data lines by applying a positive voltage on odd rows of the data lines and applying a negative voltage on even rows of the data lines.

In one embodiment of the present disclosure, for example, the preset direction of the liquid crystal alignment layer is a pretilt angle from $0.1°$ to $0.5°$.

In one embodiment of the present disclosure, for example, the mesomorphic molecules contain a structure selected from: an azo group, a tetrahydrofuran structure and a 4,4'-dioxydiphenyl structure.

In one embodiment of the present disclosure, for example, the mesomorphic molecules and the liquid crystal molecules have a same backbone structure or only have differences in benzene ring, backbone carbon atom or substituent position.

Embodiments of the present disclosure provide a liquid crystal alignment layer manufactured by the above described manufacturing method.

Embodiments of the present disclosure provide a display device, comprising the above described liquid crystal alignment layer.

In one embodiment of the present disclosure, for example, in the display device, liquid crystals between two adjacent subpixels have opposite initial alignment directions.

In one embodiment of the present disclosure, for example, in the display device, liquid crystals of subpixels for a same color in two adjacent pixels have opposite initial alignment directions.

In the method for manufacturing the liquid crystal alignment layer, the liquid crystal alignment layer and the display device, provided by the present invention, firstly, liquid crystals are added with a curable liquid alignment material including polar molecules; secondly, an electric field or a magnetic field is applied, so that the polar molecules in the alignment material can be rotated to a direction consistent with a preset direction of the liquid crystal alignment layer; thirdly, performing curing process under the electric field or the magnetic field, until a curing reaction of the alignment material is completed; and finally, an alignment layer is formed. Thus, the polar molecules in the alignment layer are arranged along the preset direction, and the liquid crystal molecules can be induced to be arranged along the preset direction, and hence the function of the liquid crystal alignment layer can be achieved. The manufacturing method for the liquid crystal alignment layer provided by the embodiments, shows uniform alignment and reduces costs, overcomes the defects of the friction alignment method, and allows the display device to obtain good and homogeneous optical performances.

BRIEF DESCRIPTION OF THE DRAWINGS

In order to clearly illustrate the technical solution of the embodiments of the disclosure, the drawings of the embodiments will be briefly described in the following, it is obvious that the described drawings are only related to some embodiments of the disclosure and thus are not limitative of the disclosure.

REFERENCE NUMERALS OF THE ACCOMPANYING DRAWINGS

13—gate line, 11a—data line in an even row, 11b—data line in an odd row, 21—pixel, 22—pixel.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Embodiments of the present invention provide a manufacturing method for a liquid crystal alignment layer, a liquid crystal alignment layer and a display device, which have uniform alignment and low costs, overcome the defects of the friction alignment method, and allow the display device to obtain good and homogeneous optical performances.

Clear and complete description will be given below to the technical proposals in the embodiments of the present invention with reference to the accompanying drawings in the embodiments of the present invention.

Figure 1:
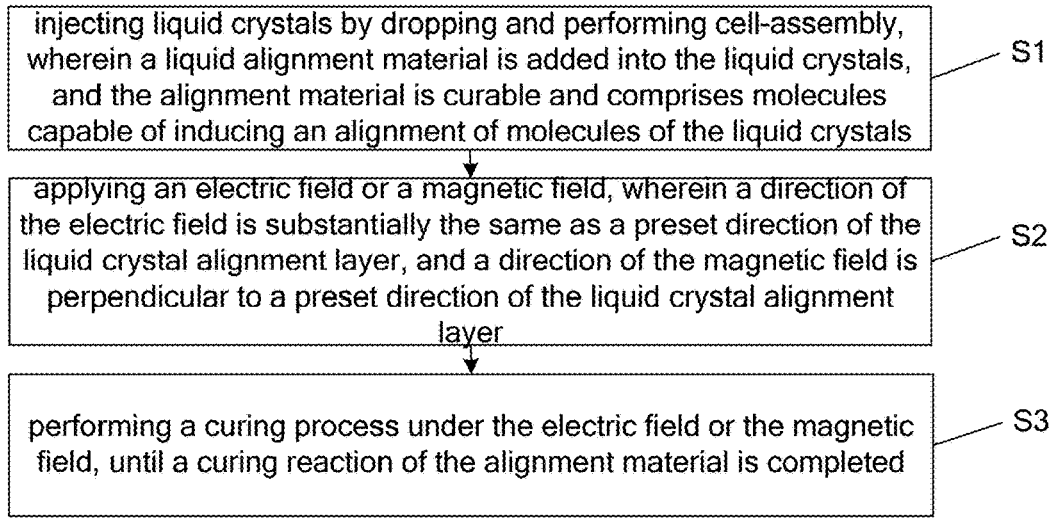
FIG. 1 is a flow diagram of a manufacturing method for a liquid crystal alignment layer provided by the embodiments of the present invention.

The embodiment of the present invention provides a manufacturing method for a liquid crystal alignment layer. As illustrated in FIG. 1, the method comprises the steps S1, S2 and S3.

S1: injecting liquid crystals through dropping and performing cell-assembly, wherein a liquid alignment material is added into the liquid crystals, and the alignment material is curable and comprises molecules capable of inducing an alignment of molecules of the liquid crystals.

In the present embodiment, the alignment material should satisfy the following conditions to form the liquid crystal alignment layer: the alignment material is in liquid state or quasi-liquid state (e.g., liquid crystal state or mesomorphic state) capable of being dripped together with the liquid crystals before the step S1, and can be subjected to curing reaction under certain conditions; and the alignment material at least comprises molecules capable of inducing an alignment of molecules of the liquid crystals. The molecules capable of inducing the alignment of molecules of the liquid crystals can be arranged in order under the electric field or the magnetic field, so that the molecules of the liquid crystals can also be induced to be orderly arranged and have consistent alignment.

It should be understood by those skilled in the art that the molecules capable of inducing the alignment of the molecules of the liquid crystals may be second liquid crystals or mesomorphic molecules different from the liquid crystals for display.

In addition, the present embodiment does not exclude the case that the alignment material also comprises other ancillary materials, for instance, a photoinitiator capable of initiating photo-curing reaction.

S2: applying an electric field or a magnetic field, wherein a direction of the electric field is substantially the same as a preset direction of the liquid crystal alignment layer, and a direction of the magnetic field is perpendicular to a preset direction of the liquid crystal alignment layer.

In the present step, the molecules of the alignment material that are capable of inducing the alignment of the molecules of the liquid crystals can be orderly arranged along the preset direction under the action of the electric field or the magnetic field, and the preset direction is the alignment direction of the liquid crystal alignment layer in accordance with design requirements (the preset direction of the liquid crystal alignment layer). If the electric field are applied in the present step, the direction of the applied electric field is the same or almost the same as the preset direction of the liquid crystal alignment layer; and if the magnetic field are applied in the present step, the direction of the applied magnetic field is perpendicular to the preset direction of the liquid crystal alignment layer. In summary, the direction of the applied electric field or magnetic field is not restricted in the present embodiment, as long as the molecules capable of inducing the alignment of the molecules of the liquid crystals can be orderly arranged along the preset direction under the action of the electric field or the magnetic field.

In some embodiments, the preset direction of the liquid crystal alignment layer is a pretilt angle from 0.1° to 0.5°.

S3: performing curing process under the electric field or the magnetic field, until a curing reaction of the alignment material is completed.

In the present step, illumination, heating or other means for promoting the curing reaction is performed under the electric field or the magnetic field, namely when the molecules capable of inducing the alignment of the liquid crystal molecules are orderly arranged along the preset direction, so that a curing reaction of the alignment material can be completed and the alignment layer can be formed. The alignment layer comprises the molecules capable of inducing the alignment of the liquid crystal molecules which are orderly arranged along the preset direction, so that the liquid crystal molecules can be induced to be arranged along the preset direction, and hence the function of the liquid crystal alignment layer can be achieved.

The method for manufacturing the liquid crystal alignment layer provided by the present embodiment can obtain the liquid crystal alignment layer with consistent alignment only by applying the electric field or the magnetic field, allows the display device to obtain good and homogeneous optical performances, has low costs, and overcomes the defects of the friction alignment method.

To make the manufacturing method for the liquid crystal alignment layer provided by the embodiments of the present invention easy to understand, detailed description will be given below to the manufacturing method for the liquid crystal alignment layer provided by the present invention, with reference to the preferred embodiments by taking the ADS mode as an example. The technological process of the present invention are as follows:

Compared with the conventional cell process, the manufacturing process of the present invention reduces the coating process of polyimide (PI, alignment layer materials in the conventional means) and the friction alignment process but adds one UV curing process. The UV curing process specifically comprises the following steps 1, 2 and 3.

Step 1: adding mesomorphic molecules and a photoinitiator into the liquid crystals, wherein a content of the mesomorphic molecules constitutes 1/1000-5/100 of the total amount, and a content of the photoinitiator constitutes 0.1/1000-5/100 of the total amount; and subsequently, performing the processes of injection by dropping and cell-assembling.

That is to say, the alignment material added into the liquid crystals in the present embodiment comprises the mesomorphic molecules and the photoinitiator, wherein the mesomorphic molecules may be a compound containing an azo group, a tetrahydrofuran structure, a 4,4'-dioxydiphenyl structure and the like. The mesomorphic molecules may have same or similar backbone structure with the liquid crystal molecules, and can have the function of increasing the anchoring energy. Due to the increase of the anchoring energy, the problem of poor alignment effect due to the original low anchoring energy can be effectively solved, and the display quality of the panel can be improved. Herein, the description that the mesomorphic molecules and the liquid crystal molecules have similar backbone structure refers to that there are differences only in, for instance, benzene ring, backbone carbon atom, substituent position, etc.

The injection by dropping and cell-assembly processes are pretty much the same as the conventional means and may refer to the conventional means. No further description will be given here.

Figure 2:
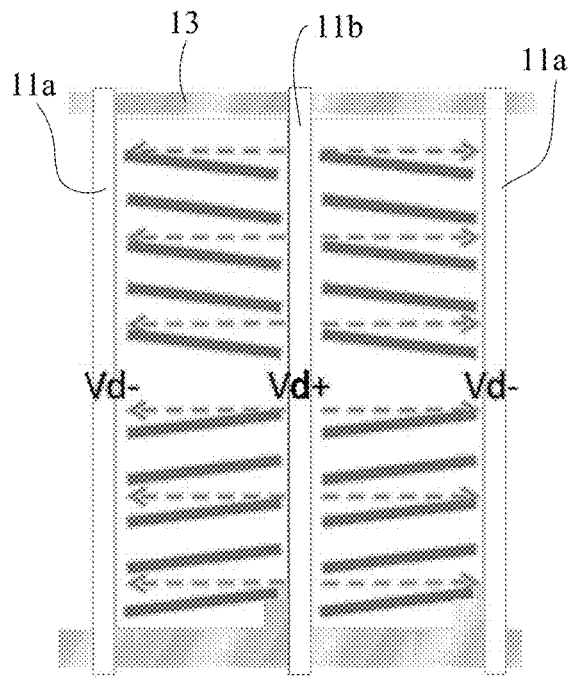
FIG. 2 is a schematic diagram illustrating the process of applying an electric field to an advanced super dimension switch (ADS) product in the embodiment of the present invention.

Step 2: as shown in FIG. 2, applying an electric field, so as to provide an initial alignment direction and an initial pretilt angle (e.g., from 0.2° to 0.5°) for the liquid crystals and the mesomorphic molecules therein.

Step 3: adopting UV light with a wavelength from 285 nm to 380 nm for illumination when applying the electric field.

In the present step 3, photo-curing process is performed under the electric field, until a curing reaction of the mesomorphic molecules is completed under the action of the photoinitiator. Wherein, the direction of the applied electric field is as shown in FIG. 2: different voltages (e.g., opposite voltages) are applied to data lines, for instance, positive voltage Vd+ is applied to odd rows of data lines 11b and negative voltage Vd− is applied to even rows of data lines 11a, so that the electric field can be formed between the odd and even rows of data lines, and hence the liquid crystals and the mesomorphic molecules can obtain the initial alignment direction. In some embodiments, negative voltage Vd− is applied to the odd rows of data lines 11b, and positive voltage Vd+ is applied to the even rows of data lines 11a.

Figure 3:
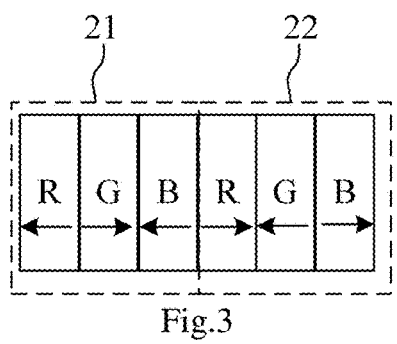
FIG. 3 is a schematic diagram illustrating the alignment of a liquid crystal alignment layer of adjacent pixels in the embodiment of the present invention.

Moreover, as shown in FIG. 3, as voltage with opposite directions is applied to the odd and even rows, any two adjacent subpixels have opposite liquid crystal alignments, and subpixels for a same color in two adjacent pixels also have opposite liquid crystal alignments. In FIG. 3, liquid crystals in an R subpixel in a pixel 21 and an R subpixel in a pixel 22 have opposite alignments, so that liquid crystals in adjacent subpixels and adjacent subpixels for a same color have different pretilt angles, and hence there is compensation in the liquid crystal alignment of subpixels with adjacent colors (based on three primary colors), and the color shift will be same when viewed from the left side or the right side.

Of course, in the manufacturing method for the liquid crystal alignment layer, the electric field may also be formed between adjacent rows of gate lines by applying different voltages (e.g., opposite voltages) to adjacent gate lines as required.

In the present embodiment, high molecular polymers are formed and cured to form the alignment layer; multi-dimensional drive is achieved by adoption of the high molecular polymers to maintain the alignment anchoring energy of the liquid crystal molecules; the pretilt angle compensation between adjacent subpixels can be achieved by applying voltage with different potentials to odd and even rows; and hence good optical display characteristics can be obtained. The manufacturing method for the liquid crystal alignment layer provided by the present embodiment is also applicable to in-plane switching (IPS) mode.

The embodiment of the present invention further provides a liquid crystal alignment layer manufactured by any foregoing manufacturing method, and a display device comprising the liquid crystal alignment layer manufactured by the above methods. The liquid crystal alignment layer provided by the present embodiment has uniform alignment and low costs and allows the display device to obtain good and homogeneous optical performances. The display device has low costs and can obtain higher display quality due to the adoption of the liquid crystal alignment layer manufactured by the above method. The display device may be: any product or component with display function such as an LCD panel, e-paper, a mobile phone, a tablet PC, a TV, a display, a notebook computer, a digital picture frame and a navigator.

For clear description, the words such as first and second are used in the present invention to classify similar items, are not intended to limit the present invention in number, but only intended to illustrate a preferred embodiment. Obvious similar deformations or related extensions that are thought of by those skilled in the art according to the content of the present invention shall fall within the scope of protection of the present invention.

The embodiments in the Description are all described in a progressive manner. Same and similar parts of the embodiments refer to each other. Each embodiment emphasizes those different from other embodiments. Particularly, as device embodiments are basically similar to method embodiments, the device embodiments are relatively simply described, and relevant parts refer to partial description of the method embodiments.

What are described above is related to the illustrative embodiments of the disclosure only and not limitative to the scope of the disclosure; the scopes of the disclosure are defined by the accompanying claims.

The present application claims the priority of the Chinese Patent Application No. 201510600999.8 filed on Sep. 18, 2015, which is incorporated herein by reference as part of the disclosure of the present application.

What is claimed is:

1. A manufacturing method of a liquid crystal alignment layer, comprising:
   S1: injecting liquid crystals by dropping and performing cell-assembly, wherein a liquid alignment material is added into the liquid crystals, and the alignment material is curable and comprises molecules capable of inducing an alignment of molecules of the liquid crystals;
   S2: applying an electric field or a magnetic field, wherein a direction of the electric field is substantially the same as a preset direction of the liquid crystal alignment layer, and a direction of the magnetic field is substantially perpendicular to a preset direction of the liquid crystal alignment layer; and S3: performing a curing process under the electric field or the magnetic field, until a curing reaction of the alignment material is completed, wherein the alignment material comprises mesomorphic molecules, wherein in operations S2 and S3:

forming the electric field between adjacent rows of data lines by applying different voltages on adjacent data lines, or forming the electric field between adjacent rows of gate lines by applying different voltages on adjacent gate lines, in operations S2 and S3: forming the electric field between the adjacent rows of the data lines by applying a positive voltage on odd rows of the data lines and applying a negative voltage on even rows of the data lines, wherein the mesomorphic molecules contain a structure selected from: an azo group, a tetrahydrofuran structure and a 4,4'-dioxydiphenyl structure, and wherein the mesomorphic molecules and the liquid crystal molecules have a same backbone structure or only have differences in benzene ring, backbone carbon atom or substituent position.

2. The manufacturing method according to claim 1, wherein the alignment material further comprises a photoinitiator; and operation S3 comprises:

performing a photo-curing process under the electric field or the magnetic field, until a curing reaction of the mesomorphic molecules is completed under an action of the photoinitiator.

3. The manufacturing method according to claim 2, wherein the mesomorphic molecules constitute 1/1000-5/100 of a total amount of the liquid crystals and the alignment material.

4. The manufacturing method according to claim 3, wherein the photoinitiator constitutes 0.1/1000-5/100 of a total amount of the liquid crystals and the alignment material.

5. The manufacturing method according to claim 3, wherein ultraviolet (UV) light with a wavelength from 285 nm to 380 nm is employed in the photo-curing process.

6. The manufacturing method according to claim 2, wherein the photoinitiator constitutes 0.1/1000-5/100 of a total amount of the liquid crystals and the alignment material.

7. The manufacturing method according to claim 2, wherein ultraviolet (UV) light with a wavelength from 285 nm to 380 nm is employed in the photo-curing process.

8. The manufacturing method according to claim 1, wherein the preset direction of the liquid crystal alignment layer is a pretilt angle from 0.1° to 0.5°.

9. A liquid crystal alignment layer manufactured by the manufacturing method according to claim 1.

10. A display device, comprising the liquid crystal alignment layer according to claim 9.

11. The display device according to claim 10, wherein liquid crystals between two adjacent subpixels have opposite initial alignment directions.

12. The display device according to claim 10, wherein liquid crystals of subpixels for a same color in two adjacent pixels have opposite initial alignment directions.

* * * * *